United States Patent [19]

Conley et al.

[11] Patent Number: 4,938,246

[45] Date of Patent: Jul. 3, 1990

[54] CLEANING TOOL FOR A VALVE MANIFOLD

[76] Inventors: Jeff A. Conley, 13111 Nantucket, Sugar Land, Tex. 77478; Randall J. Miller, 2231 Greencove La., Sugar Land, Tex. 77479

[21] Appl. No.: 432,238

[22] Filed: Nov. 6, 1989

[51] Int. Cl.[5] .......................... B08B 1/00; B08B 9/04; F16K 51/00

[52] U.S. Cl. .......................................... 137/15; 73/201; 73/756; 73/861.42; 15/104.16; 15/246; 137/244; 137/245.5; 137/269; 137/315; 137/343; 137/884; 248/207; 248/230

[58] Field of Search ...................... 73/201, 756, 861.42, 73/861.61; 15/104.16, 246; 137/15, 244, 245.5, 269, 271, 315, 343, 356, 884, 886, 887; 248/71, 72, 74.4, 207, 230, 231.6

[56] References Cited

U.S. PATENT DOCUMENTS

| | | | |
|---|---|---|---|
| 2,823,542 | 2/1958 | Walraven et al. | 73/756 |
| 2,871,881 | 2/1959 | Hewson | 137/886 |
| 3,817,283 | 6/1974 | Hewson | 137/884 |
| 4,182,362 | 1/1980 | Hewson et al. | 137/340 |
| 4,192,342 | 3/1980 | Adams | 137/245.5 |
| 4,193,420 | 3/1980 | Hewson | 73/201 |
| 4,284,100 | 8/1981 | Scapes et al. | 137/884 |
| 4,391,289 | 7/1983 | Adams | 137/245.5 |
| 4,582,089 | 4/1986 | Nimberger | 137/884 |
| 4,672,728 | 6/1987 | Nimberger | 137/884 |

OTHER PUBLICATIONS

Anderson, Greenwood & Co., "AGCO Manifolds", Oct. 1980, Catalog 3000, pp. 1-29.

Anderson, Greenwood & Co., Catalog 3000, dated Jun. 1982, cover page, pp. 1 and 10.

*Primary Examiner*—George L. Walton

*Attorney, Agent, or Firm*—Dodge Bush & Moseley

[57] ABSTRACT

A cleaning tool (46) for removable attachment to a valve manifold (10) upon removal of instrumentation (26) therefrom for cleaning the axial bore (29) of the valve manifold (22). The manifold (22) which has a mounting flange (56) supporting the instrument (26) for measuring, monitoring, or recording differential fluid pressures from a main flow line. The cleaning tool (46) has a flange (56) thereon adapted to fit in mating relation against the flange (36) on the valve manifold (22) upon removal of the instrument (26). A cleaning rod (62) of the cleaning tool (46) has an enlarged diameter cleaning member (68) thereon for cleaning the axial bore (29) of the valve manifold (22) upon manual reciprocation of the cleaning rod (62).

5 Claims, 2 Drawing Sheets

CLEANING TOOL FOR A VALVE MANIFOLD

BACKGROUND OF THE INVENTION

This invention relates to a cleaning tool for a valve manifold and more particularly to a cleaning tool adapted for connection to a flanged manifold.

Heretofore, valve manifolds have been provided with instrumentation, such as a pressure transmitter or various types of gauges, for example, which are connected to the manifold. To permit a gauge or transmitter to be easily attached to a manifold, the manifold has been detachably mounted on a stand or support and has been formed with a flange on which the gauge or transmitter is detachably connected. Thus, it has been common heretofore to mount a flanged manifold on a support with the pressure transmitter connected to a flange of the manifold.

A transmitter, such as a differential pressure transmitter, may be a direct reading instrument, such as a manometer, or a differential pressure cell producing an output signal to a remote location. An example of a mounting for such a valve manifold and pressure transmitter is shown in U.S. Pat. No. 4,182,362. A flange on the manifold has a planar face and the transmitter normally has a flange with a matching planar face for direct mounting of the transmitter thereon by suitable bolt and nut combinations. The transmitter, or other instrument, is easily attached and detached from the manifold.

Such a valve manifold has a so-called block valve to block the pressure to the transmitter to permit the instrument to be removed while the manifold is under pressure. The manifold is utilized in various services with different fluids including partial solids and it is desirable at times to clean an axial bore in the manifold in fluid communication with the instrumentation, as well as the ports in the valves for such axial bore since solids or foreign matter may tend to adhere to the surfaces defining the bore or ports.

SUMMARY OF THE INVENTION

The present invention is particularly directed to a cleaning tool for cleaning a flanged valve manifold and adapted for attachment to the flanged valve manifold upon removal of an associated instrument from the mounting flange of the manifold. The cleaning tool has a mating flange which is easily bolted onto the mounting flange of the manifold while the manifold is under pressure with the block valve being closed.

The cleaning tool has a body with a central bore receiving a rod with a cleaning member on its inner end and a handle on its outer opposed end for manual reciprocation to provide a cleaning action. The cleaning member in a retracted position is received within an enlarged end bore portion. For installation of the cleaning tool, the instrumentation is first removed from the mounting flange of the supporting manifold, and a mating flange on the cleaning tool is bolted to the mounting flange of the manifold with the cleaning member in a retracted position and the block valve in a closed position on the manifold. Upon securement of the cleaning tool in a sealed relation, the block valve may be opened for cleaning of the bore and valve ports upon extension of the cleaning member.

It is an object of the present invention to provide a cleaning tool adapted to be removably connected to a flange of a valve manifold upon removal of instrumentation from the manifold flange.

It is a further object of this invention to provide such a cleaning tool having a reciprocal rod with a cleaning member on one end retracted within an enlarged end bore portion of the tool body upon assembly of the cleaning tool on the manifold while the manifold is under pressurized service.

An additional object is to provide a method of assembly of the cleaning tool onto a mounting flange of the valve manifold.

Other objects, features, and advantages of this invention will become more apparent after referring to the following specifications and drawings.

DESCRIPTION OF THE INVENTION

Figure 1:
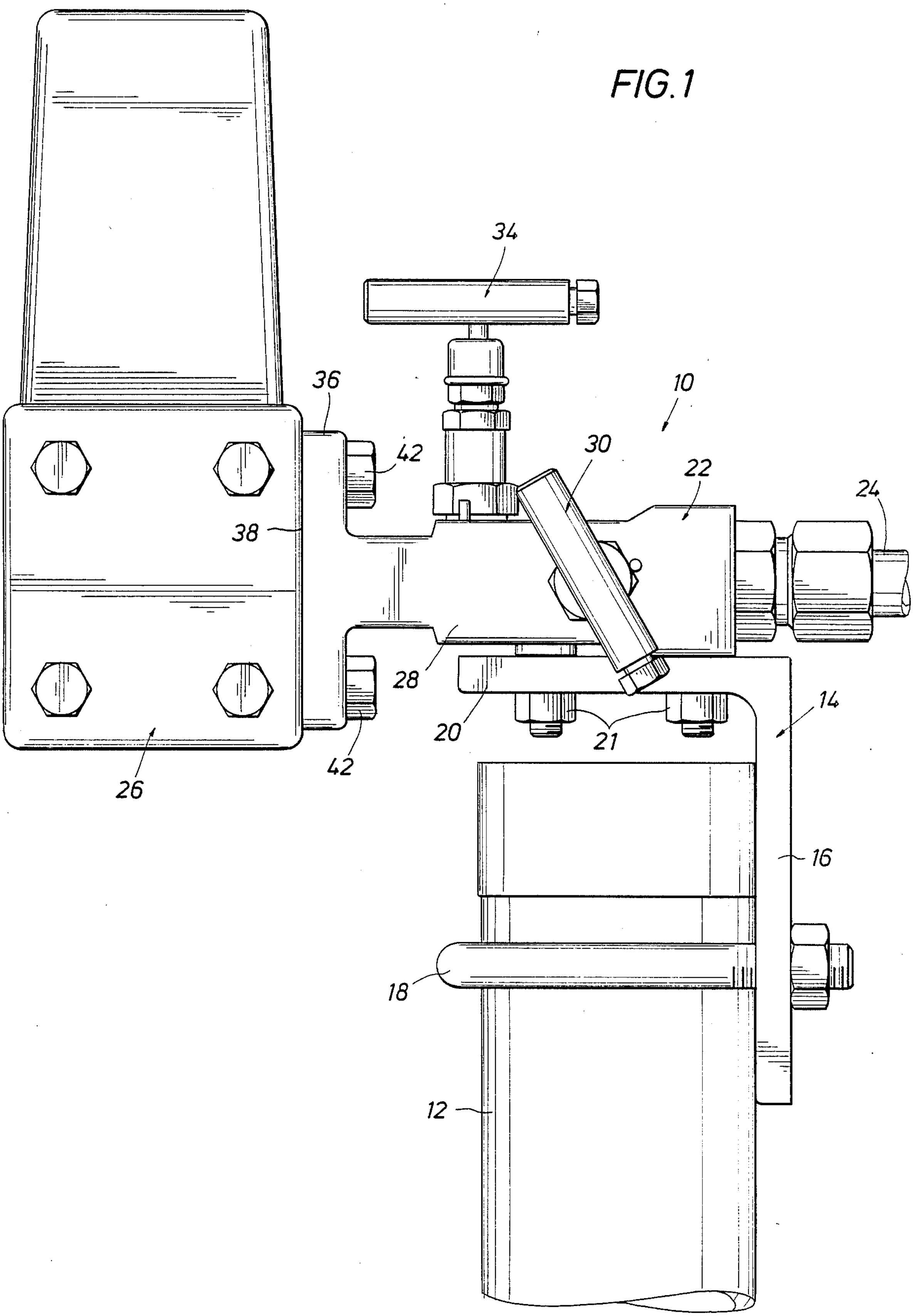
FIG. 1 is a side elevation of a valve manifold assembly which is particularly adapted for use with the cleaning tool of this present invention and includes a valve manifold mounted on an upright and a transmitter removably mounted on a side mounting flange of the manifold.

Referring now to the drawings for a better understanding of this invention and more particularly to FIG. 1, a valve manifold assembly is shown generally at 10 mounted on a vertically extending stand or post 12. A mounting angle 14 for manifold 10 has a vertical leg 16 secured by a U-bolt 18 to stand 12. A horizontal leg 20 of angle 14 provides an upper supporting surface for manifold assembly 10 and fasteners 21 removably mount manifold assembly 10 to leg 20.

Manifold assembly 10 include a valve manifold shown generally at 22 and fluid lines 24,25 including low pressure and high pressure lines are connected thereto leading to a main fluid line (not shown). An instrument, such as a pressure transmitter generally indicated at 26 is removably connected to manifold 22 and is adapted to transmit output signals to a remote location.

Manifold 22 has a body 28 including an axial bore 29 extending therethrough and in fluid communication with fluid line 24. A block valve 30 generally indicated at 30 has a valve member 31 on its lower end for seating in a closed position on valve seat 32 having ports 33 therein. Block valve 30 blocks the fluid flow through bore 29 to transmitter 26 from line 24 when valve member 31 is closed. Thus, fluid pressure to transmitter 26 can be blocked. Suitable valves 34 permit selective flow of fluid from additional fluid lines to transmitter 26 through bore 35.

Manifold body 22 has a side flange 36 defining a vertically extending planar face 38 opposite lines 24 and 25. Suitable openings 40 in flange 36 receive bolts 42 for mounting transmitter 26.

From time to time, depending on the specific fluid product in the main flow line to which valve manifold assembly 10 is attached for monitoring or recording pressure differentials in the main flow line, foreign matter or solid matter in the product may tend to collect in the bores or ports of the valve manifold and it is desirable to clean periodically the bores and valve ports in the manifold. For this purpose, a cleaning tool generally indicated at 46 is shown for attachment to mounting flange 36 upon removal of the instrument or differential pressure transmitter 26. Cleaning tool 46 comprises an elongate body 48 having a central main bore 50 therethrough and defining an enlarged diameter inner bore portion 52 with an annular shoulder 54 formed at the juncture of the large diameter bore portion 52 and main bore portion 50.

A flange 56 is provided on the inner end of body 48 and has a planar inner face 58 extending at right angles to the longitudinal axis of elongated body 48. Internally threaded openings 60 are provided in flange 56 in axial alignment with openings 40 in mounting flange 36 of valve manifold 22. Externally threaded bolts 42 are threaded within openings 60 to secure flange 56 to mounting flange 36 with faces 38 and 58 in matching facing contact. An O-ring 60 mounted in annular groove 61 in face 38 forms a sealing relation between faces 37 and 58 of flanges 36 and 56.

A rod 62 fits within central bore 50 and has a removable handle 64 on an outer extending end thereof secured to rod 62 by a retaining screw 66. A cleaning member 68 is mounted on the inner end of rod 62 and is of a generally cylindrical enlarged diameter having an inclined leading surface 70 forming a sharp edge for scraping along axial bore 29 and valve ports 33 of manifold 22. Cleaning member 68 is of an enlarged diameter smaller than the diameter of enlarged bore portion 52 receiving cleaning member 68 therein in a retracted position and of a diameter smaller than the diameter of axial bore 29 of the valve manifold 22 thereby to fit within axial bore 29 for cleaning thereof. Shoulder 72 is adapted to abut shoulder 54 in retracted position.

Elongated body 48 has an externally threaded outer end portion 74 having a recess defining an inner annular shoulder about bore 50 and spaced from annular end surface 78 of body 48. A packing 80 is received within the recess and a washer 82 is positioned about rod 62 adjacent the outer end surface of packing 80. Washer 82 is received within an internally threaded nut 84 which is threaded onto the externally threaded outer end portion 74 of elongated body 48 thereby to compress packing 80 for sealing about rod 62 upon tightening of nut 84.

Figures 2, 3:
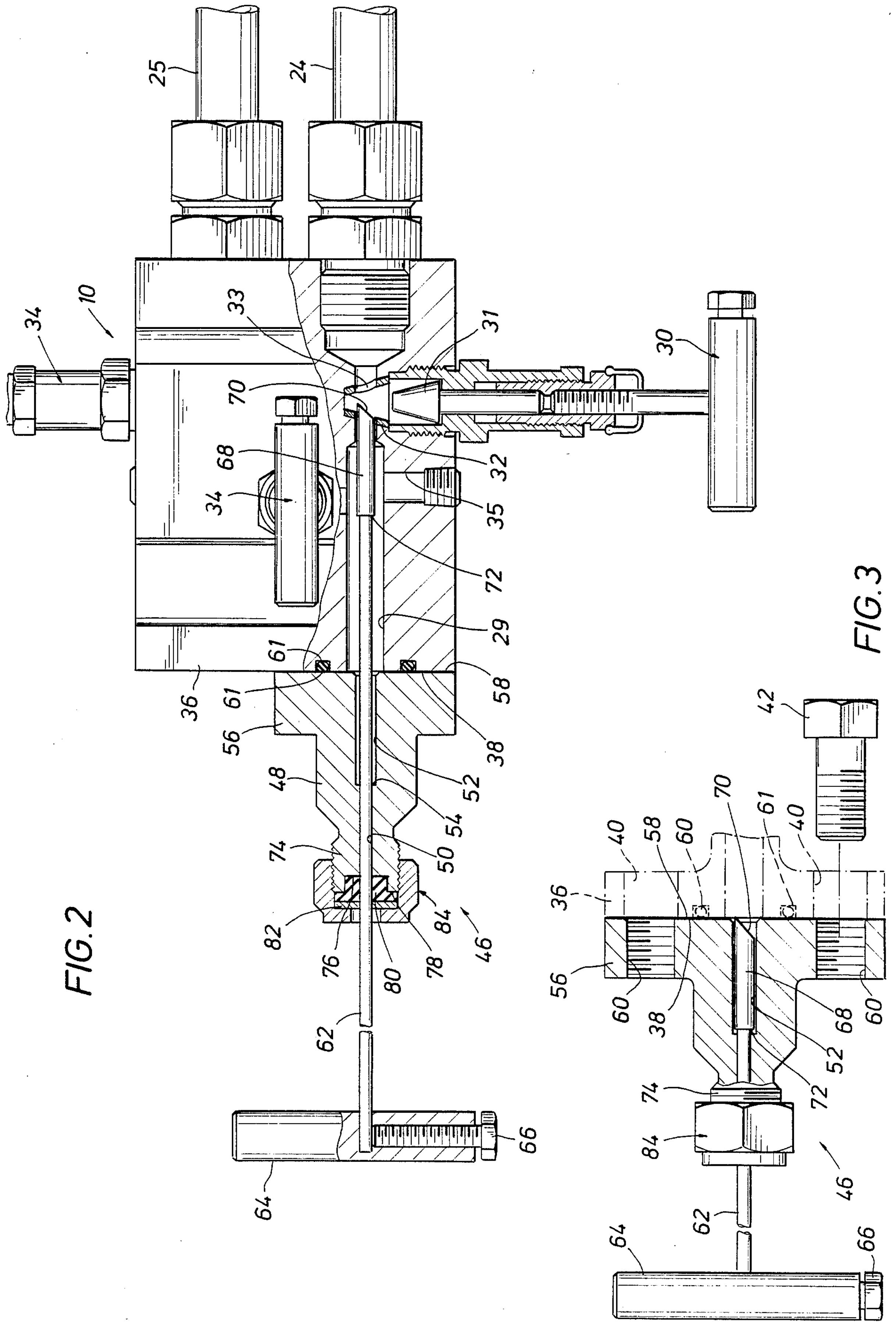
FIG. 2 is top plan view, partly in section, of the manifold assembly of FIG. 1 but showing the transmitter removed from the valve manifold and the cleaning tool of the present invention mounted on the side mounting flange of the valve manifold with the cleaning member extending within the manifold bore and the port of the seat for the block valve.
FIG. 3 is a section of the cleaning tool removed from the valve manifold with the cleaning member shown in a retracted position received within an enlarged bore portion of the tool body.

If desired to clean axial bore 29 of valve manifold 22 and ports 33 of valve seat 32 therein, valve 30 is moved to a closed position with valve member 31 closing ports 33 to block any fluid flow through bore 29 from pressure line 24 to instrument or transmitter 26. Then, instrument 26 is removed from manifold 22 by removal of bolts 42. O-ring 60 is removed from groove 61 in face 38 of flange 36 and a new O-ring 60 is then positioned within groove 61. Then, with cleaning member 68 being in retracted position within enlarged bore portion 52 as shown in FIG. 3, the cleaning tool 46 is mounted on flange 36 with mating opposed faces 38 and 58 being in contact relation to each other and openings 40 being in axial alignment with threaded openings 60. Then, bolts 42 are threaded within openings 60 for securing flange 56 in mating sealing relation against flange 36 with O-ring 60 maintaining sealing relation. Next, valve member 31 is moved to an opened position to permit fluid flow through ports 33 and axial bore 29 within tool body 48 through central bore 50. Packing 80 maintains sealing relation to prevent any leakage of pressurized fluid from axial bore 29. Then, manual reciprocation of rod 62 extends enlarged cleaning member 68 within bore 30 and valve ports 33 for cleaning bore 29 and associated ports 33 of any solids or foreign materials adhering to the surfaces thereof. After cleaning of manifold 22, cleaning member 68 is moved to a retracted position and member 31 is then moved to a closed position. Cleaning tool 46 is then removed from flange 36 by removal of bolts 42. Then, instrument 26 may be remounted onto flange 36 by bolts 42. In this manner, a portable and detachable cleaning tool 46 has been easily mounted on and removed from a valve manifold 22 while the valve manifold remains in a pressurized condition. Flanges 36 and 56 are easily positioned and aligned for the mounting of tool 46 onto flange 36 in sealing relation in a minimum of time.

While only a single flange 36 for mounting an instrument is shown in the embodiment illustrated in the drawings, it is to be understood that a second mounting flange may be provided for manifold 22 if desired, with another instrument mounted on the additional mounting flange.

While a preferred embodiment of a present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In combination with a valve manifold having an axial bore therethrough in fluid communication with low and high pressure lines and a manually actuated valve on the manifold for blocking fluid flow through said axial bore, said manifold having a mounting flange thereon adapted to removably support instrumentation thereon; an improved portable cleaning tool for the axial bore of said valve manifold adapted to be removably mounted on the mounting flange of said manifold upon removal of the instrumentation therefrom, said cleaning tool comprising:

an elongate body having a central bore therethrough and a flange on one end thereof forming a planar surface extending at right angles to the longitudinal axis of said elongate body, said flange fitting in mating contact against said mounting flange on said valve manifold;

fasteners securing said flanges together with said central bore of said elongate body being in alignment with the axial bore of said valve manifold; and a rod extending through said central bore having a handle on an outer end thereof and an enlarged diameter cleaning member on the opposite inner end thereof of a diameter slightly less than the diameter of said valve manifold bore and larger than the diameter of said central bore, said central bore of said cleaning tool body having an enlarged diameter end portion receiving said cleaning member in a retracted position, said rod being mounted for reciprocal movement relative to said elongate body and said valve manifold for cleaning said manifold bore upon opening of said manually actuated valve whereby after cleaning said manifold bore, said cleaning tool is removed from said manifold mounting flange to permit said instrumentation to be remounted thereon.

2. The combination as set forth in claim 1 wherein said elongate body has an externally threaded outer end portion receiving a packing extending about said rod; and an internally threaded nut is threaded onto said outer end portion for compressing said packing for forming a sealing relation about said rod.

3. The combination as set forth in claim 1 wherein an elastomeric O-ring is positioned between said flanges in concentric relation to said manifold bore for sealing therebetween.

4. A method of cleaning the axial bore of a valve manifold which has a mounting flange thereon supporting an instrument, the valve manifold having an axial bore therein for cleaning by a cleaning tool and a manually actuated valve for blocking fluid flow to said instrument through said axial bore when in a closed position; said method comprising the following steps:

moving said manually actuated valve to closed position for blocking fluid flow to said instrument;

then removing said instrument from the mounting flange of said valve manifold;

next mounting the cleaning tool having a flange thereon onto the mounting flange of said valve manifold in sealing relation, the cleaning tool having a central bore therethrough in alignment with an axial bore through said valve manifold and including a manually reciprocable rod received within said central bore having a cleaning member of an enlarged diameter on its inner end for fitting within the axial bore of the tool;

moving said manually actuated valve to open position to permit fluid flow to said cleaning tool;

manually reciprocating the rod by manually gripping of a handle thereon for extending the cleaning member within said axial bore for cleaning thereof;

moving said manually actuated valve to closed position for blocking fluid flow to said axial bore adjacent said cleaning tool;

removing said cleaning tool from the mounting flange on said valve manifold;

then remounting said instrument onto the mounting flange of said valve manifold; and moving said manually actuated valve to open position for providing fluid flow to said instrument from said axial bore of said valve manifold for returning said instrument to service.

5. The method of cleaning the axial bore of a valve manifold as set forth in claim 4 including the steps of:

removing an O-ring seal from a groove in said mounting flange of said valve manifold upon removal of said instrument from the mounting flange; and replacing said O-ring seal with another O-ring seal prior to mounting of said cleaning tool onto said mounting flange for sealing between the flanges of said cleaning tool and said valve manifold.

* * * * *